United States Patent
Douche

(10) Patent No.: US 11,117,281 B2
(45) Date of Patent: Sep. 14, 2021

(54) METHOD AND DEVICE FOR CUTTING A MAT OR A PANEL OF MINERAL WOOL OR A BOARD OR A PANEL OF POROUS CONSTRUCTION MATERIAL

(71) Applicant: SAINT-GOBAIN PLACO, Suresnes (FR)

(72) Inventor: Jean-Pierre Douche, Le Plessis Brion (FR)

(73) Assignee: SAINT-GOBAIN PLACO, Suresnes (FR)

( * ) Notice: Subject to any disclaimer, the term of this patent is extended or adjusted under 35 U.S.C. 154(b) by 0 days.

(21) Appl. No.: 16/649,402

(22) PCT Filed: Sep. 21, 2018

(86) PCT No.: PCT/FR2018/052307
§ 371 (c)(1),
(2) Date: Mar. 20, 2020

(87) PCT Pub. No.: WO2019/058066
PCT Pub. Date: Mar. 28, 2019

(65) Prior Publication Data
US 2020/0307009 A1  Oct. 1, 2020

(30) Foreign Application Priority Data
Sep. 21, 2017 (FR) .................................. 1758729

(51) Int. Cl.
*B26D 1/48* (2006.01)
*B23D 55/06* (2006.01)
(Continued)

(52) U.S. Cl.
CPC ............. *B26D 1/48* (2013.01); *B23D 55/065* (2013.01); *B23D 57/0007* (2013.01);
(Continued)

(58) Field of Classification Search
CPC . B26D 1/48; B26D 5/00; B26D 7/018; B26D 7/0625; B23D 55/065;
(Continued)

(56) References Cited

U.S. PATENT DOCUMENTS 3,797,341 A     3/1974   Bystron
4,436,078 A *   3/1984   Bourke .................. B28D 1/003
                                                                     125/13.01
(Continued)

FOREIGN PATENT DOCUMENTS

FR         3 048 903 A1    9/2017
FR         3 048 904 A1    9/2017
(Continued)

OTHER PUBLICATIONS

International Search Report as issued in International Patent Application No. PCT/FR2018/052307, dated Feb. 12, 2019.

*Primary Examiner* — Ghassem Alie
*Assistant Examiner* — Fernando A Ayala
(74) *Attorney, Agent, or Firm* — Pillsbury Winthrop Shaw Pittman LLP

(57) ABSTRACT

A device for cutting a mat or panel made of mineral wool or a board or panel made of porous construction material, including a system for moving the mat or panel made of mineral wool or the board or panel made of porous construction material, which includes at least one conveyor, capable of moving along a direction, an endless diamond element designed to cut the mat or panel made of mineral wool or the board or panel made of porous construction material, a device for running the endless diamond element in a direction perpendicular to the direction of movement of the mat or panel made of mineral wool or the board or panel made of porous construction material, the endless diamond (Continued)

element being an endless diamond wire, an endless diamond cable or an endless diamond strip.

21 Claims, 2 Drawing Sheets

(51) Int. Cl.
    *B23D 57/00*     (2006.01)
    *B23D 59/00*     (2006.01)
    *B23D 61/18*     (2006.01)
    *B24B 27/06*     (2006.01)
    *B26D 5/00*     (2006.01)
    *B26D 7/01*     (2006.01)
    *B26D 7/06*     (2006.01)
    *B28D 1/12*     (2006.01)

(52) U.S. Cl.
    CPC ..... *B23D 57/0046* (2013.01); *B23D 57/0053* (2013.01); *B23D 57/0069* (2013.01); *B23D 59/001* (2013.01); *B23D 61/185* (2013.01); *B24B 27/0633* (2013.01); *B26D 5/00* (2013.01); *B26D 7/018* (2013.01); *B26D 7/0625* (2013.01); *B28D 1/127* (2013.01)

(58) Field of Classification Search
    CPC ...... B23D 59/001; B23D 55/00; B23D 55/04; B23D 55/06; B23D 55/08; B23D 55/10; B23D 57/0007; B23D 57/0053; B23D 57/0069; B23D 57/0046; B23D 57/003; B23D 57/0061; B23D 5/00; B23D 61/185
    See application file for complete search history.

(56) References Cited

U.S. PATENT DOCUMENTS

| | | | |
|---|---|---|---|
| 5,033,579 A * | 7/1991 | Vanderstraeten | G10K 11/165 181/208 |
| 2003/0070524 A1* | 4/2003 | Rotter | B26D 3/06 83/781 |
| 2003/0172791 A1* | 9/2003 | Bieri | B23D 57/0053 83/651.1 |
| 2011/0119934 A1* | 5/2011 | Bertsch | B23D 53/12 30/380 |
| 2014/0150766 A1* | 6/2014 | Che | C09K 3/1445 125/16.02 |
| 2015/0053196 A1* | 2/2015 | Bennett | B23D 61/185 125/21 |
| 2015/0183037 A1* | 7/2015 | Jeng | B23D 55/06 83/818 |
| 2015/0266117 A1 | 9/2015 | Koma et al. | |

FOREIGN PATENT DOCUMENTS

| | | |
|---|---|---|
| JP | S64-2897 A | 1/1989 |
| KR | 10-2004-0101856 A | 12/2004 |
| NL | 7 015 354 A | 4/1971 |
| WO | WO 2008/138064 A1 | 11/2008 |

* cited by examiner

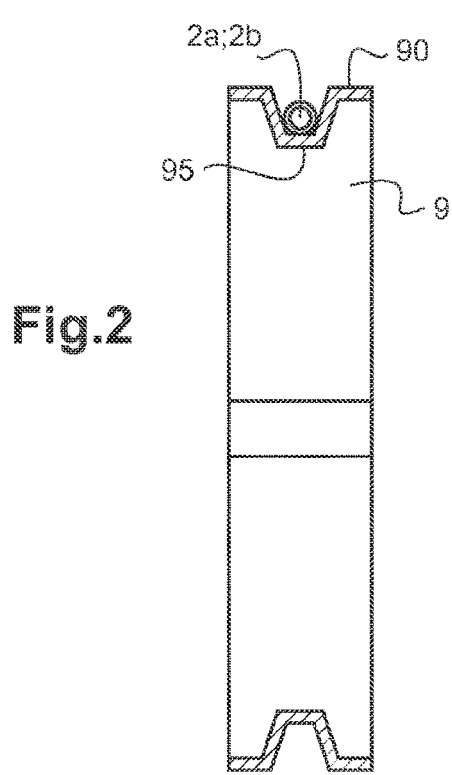
Fig.2
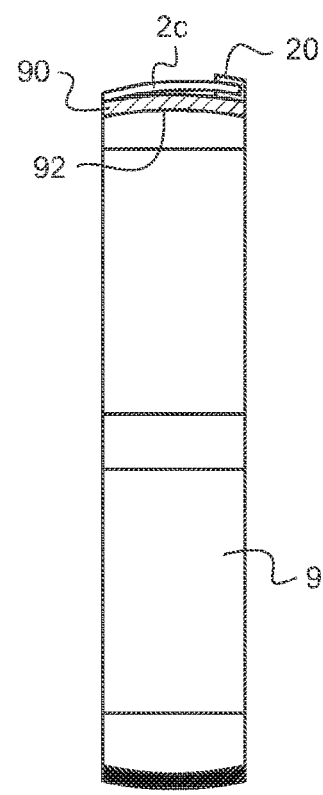
Fig.3
Fig.4
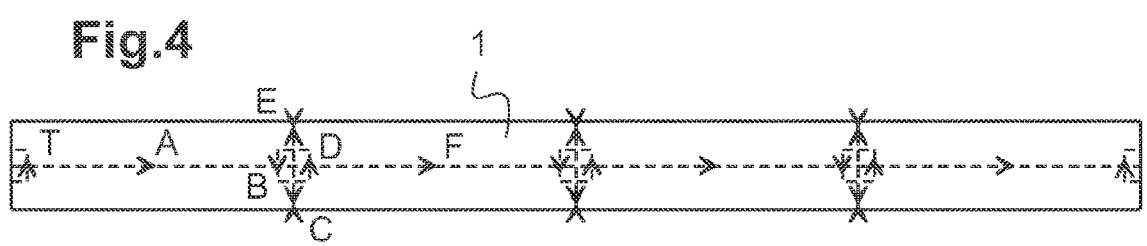
Fig.5
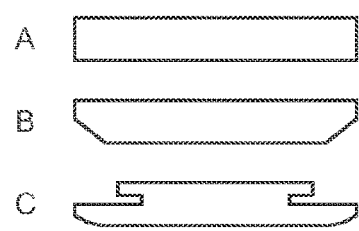
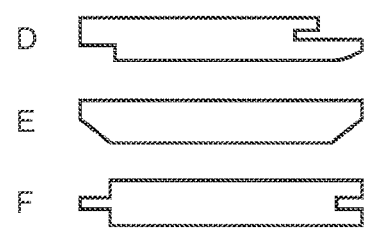

METHOD AND DEVICE FOR CUTTING A MAT OR A PANEL OF MINERAL WOOL OR A BOARD OR A PANEL OF POROUS CONSTRUCTION MATERIAL

CROSS-REFERENCE TO RELATED APPLICATIONS

This application is the U.S. National Stage of PCT/FR2018/052307, filed Sep. 21, 2018, which in turn claims priority to French patent application number 1758729 filed Sep. 21, 2017. The content of these applications are incorporated herein by reference in their entireties.

The invention relates firstly to a device and a method for cutting a mat or a panel made of mineral wool. It applies very particularly to sound insulation products based on mineral wool.

Mats or panels made of mineral wool are made up of mineral fibers manufactured by internal or external centrifugal fiberizing from molten mineral material. Binder is sprayed onto the mineral fibers before they land on a receiving belt. The mats or panels are obtained after passage through a drying oven in order to polymerize the binder. There are also binderless products which are consolidated through a mechanical process known as needlepunching. The mats or panels may be made of glass wool, rock wool, or even slag wool.

The mineral wool mats or panels obtained after centrifugal fiberizing sometimes need to be cut in their length or their width in order to reduce their size, in their thickness in order to produce a thinner mat and/or on their edges in order to form rabbets or any other edge detail. It is known practice to make these various cuts using a bandsaw, a circular saw and/or a router. However, these cutting devices produce cuts of mediocre quality which may require a rework operation after cutting, for example hiding with paint, or sanding. These cutting devices also have the disadvantage of generating a great deal of dust, which is potentially hazardous to the operators. Finally, saw-cutting devices generally have sawteeth which are offset in the thickness on each side of the saw blade, which may generate a cut that is wider than necessary, causing a significant amount of waste that may reach 10% by weight of the initial mat, and spoilage of the material.

This problem more particularly arises when the mineral wool product is made of rock wool, a fortiori of relatively high density (typically higher than 25 kg/m$^3$), because of the significant proportion of what are known as "unfiberized" grains which, as the saw blade passes, cause material to be torn out: not only the grain of mineral material itself, but also a bundle of fibers which are attached to this particle by the polymerized binder.

The invention relates secondly to a device and a method for cutting a board or a panel made of porous construction material. This board or this panel may be made of any porous construction materials, for example based on mineral fibers (for example glass or rock mineral wool, ceramic fibers or textile glass fibers), plant fibers and/or synthetic fibers (for example polymers).

These porous construction materials may be produced by on-line processes in which a mixture is prepared via a dry route or a liquid route, in particular as an airborne suspension of fibers, this mixture containing a binding agent, and the mixture is deposited or spread on a conveyor member and subjected to operations of setting or curing the binding agent. Finally, a solid material is obtained which is cut to the desired dimensions to fashion a final product, where appropriate prior to subsequent transformation steps. Other porous construction materials may be produced by binderless methods, in particular through mechanical means such as needlepunching in which the cohesion of the product is ensured by the entanglement of the fibers with one another. A first cut is made on-line in order to separate individual elements, and one or more cutting operations may be performed as rework operations in shaping workshops.

There are, in the on-line methods, cutting devices such as guillotine saws, bandsaws, circular saws, or even milling cutters or routers. However, these cutting devices also have the disadvantage of generating a great deal of dust, which is potentially hazardous to the operators. In addition, these cutting devices generally have sawteeth which are offset in the thickness, which may generate significant amounts of waste that may reach 10% by weight of the initial board, and spoilage of the material.

There are also high-pressure waterjet devices which, although they admittedly can limit the amount of dust, have the disadvantage of supplying a significant quantity of water to the cutting surfaces, which water may be absorbed by the porous material and compromise the properties, including the mechanical properties, of the material at the expense of the quality of the final build.

Patent applications FR1652199 and FR1652198 describe a device and a method for respectively cutting a mat or panel made of mineral wool or a board or a panel made of porous construction material by means of a diamond wire which, in one embodiment, is stretched between two reels around which it is wound, each of its ends being fastened to one of the reels. This device has the drawback of having to wind/unwind the wire in one direction and then in the other, which leads to premature wear of the wire by friction against itself during the winding. Furthermore, since the two reels are slaved to one another, this device is complicated to use in order to ensure a constant tension of the wire. Finally, since the wire has a given length, the cutting method is discontinuous owing to the stops for reversing the direction of rotation of the motors when one reel is empty, which delays production.

There is therefore a need for a device for cutting a mat or a panel made of mineral wool or a board or a panel made of porous construction material that makes it possible to produce a clean cut without subsequent sanding and via a dry route, which greatly limits the waste and dust generated, and which, moreover, has an increased service life and makes it possible to have a continuous production.

For that, the invention proposes a device for cutting a mat or panel made of mineral wall or a board or a panel made of porous construction material, comprising:
  means for moving the mat or panel made of mineral wool or the board or the panel made of porous construction material, which comprise at least one conveyor, which are capable of moving along a direction X,
  an element, that forms an endless loop provided with abrasive grains, designed to cut the mat or panel made of mineral wool or the board or the panel made of porous construction material,
  means for running the endless diamond element in a direction Y perpendicular to the direction X of movement of the mat or panel made of mineral wool or the board or the panel made of porous construction material, the element that forms an endless loop provided with abrasive grains preferably being a wire that forms an endless loop provided with abrasive grains, a cable that forms an endless loop provided with abrasive grains or a strip that forms an endless loop provided with abrasive grains.

According to another feature, the wire that forms an endless loop provided with abrasive grains is a steel wire with a diameter of between 0.80 and 1.30 mm, preferably between 0.95 and 1.15 mm, welded to the surface of which are abrasive grains, in particular of diamond or of cubic boron nitride, having a mean diameter of between 160 and 200 μm, preferably between 170 and 190 μm.

According to another feature, the cable that forms an endless loop provided with abrasive grains is a twisted multistrand steel cable with a diameter of between 0.80 and 1.30 mm, preferably between 0.95 and 1.15 mm, welded to the surface of which are abrasive grains, in particular of diamond or of cubic boron nitride, having a mean diameter of between 160 and 200 μm, preferably between 170 and 190 μm.

According to another feature, the strip that forms an endless loop provided with abrasive grains is a steel strip with a width of between 34 and 42 mm, preferably between 36 and 40 mm, and with a thickness of between 0.4 and 0.8 mm, preferably between 0.5 and 0.7 mm, comprising abrasive grains, in particular of diamond or cubic boron nitride, having a mean diameter of between 160 and 200 μm, preferably between 170 and 190 μm, welded to an edge of the strip having a width of between 2 and 5 mm.

According to another feature, the element that forms an endless loop provided with abrasive grains is placed under tension around two pulleys, the space between the two pulleys being greater than at least one dimension of the mat or panel made of mineral wool or the board or the panel made of porous construction material to be cut, one of the pulleys being freely rotatable while the other is capable of being rotated by a motor, and each pulley preferably comprising on its perimeter a coating on which the element that forms an endless loop provided with abrasive grains rests.

According to another feature, the linear run speed of the element that forms an endless loop provided with abrasive grains is between 10 m/s and 30 m/s, preferably between 10 and 20 m/s, or even between 10 and 15 m/s.

According to another feature, the tension of the wire that forms an endless loop provided with abrasive grains or of the cable that forms an endless loop provided with abrasive grains is between 150 N and 500 N, preferably between 200 and 300 N or the tension of the strip that forms an endless loop provided with abrasive grains is between 1500 N and 5000 N, preferably between 2000 and 4500 N, or even between 2000 and 3000 N.

According to another feature, the cutting device further comprises means for gripping the mat or panel made of mineral wool or the board or the panel made of porous construction material, the gripping means comprising a vacuum gripping system designed to move at the same time and in the same direction X as the means for moving the mat or panel made of mineral wool or the board or the panel made of porous construction material.

According to another feature, the cutting device further comprises means for moving the element that forms an endless loop provided with abrasive grains, the element that forms an endless loop provided with abrasive grains being capable of moving in a direction Z perpendicular both to the direction X of movement of the mat or panel made of mineral wool or the board or the panel made of porous construction material and to the run direction Y of the element that forms an endless loop provided with abrasive grains, the speed of movement of the element that forms an endless loop provided with abrasive grains preferably being between 10 mm/s and 250 mm/s, more preferentially still between 25 mm/s and 200 mm/s for cutting on the edges.

According to another feature, the speed of movement of the mat or panel made of mineral wool or the board or the panel made of porous construction material is between 200 mm/s and 1000 mm/s, preferably between 300 mm/s and 700 mm/s for cutting in the thickness and between 10 mm/s and 250 mm/s, preferably between 25 mm/s and 200 mm/s for cutting on the edges.

According to another feature, the cutting device further comprises at least one force sensor placed against the element that forms an endless loop provided with abrasive grains, and also a means for adjusting, in real time, the cutting force in order to maintain it between 10 and 30 N.

According to another feature, the abrasive grains of the element that forms an endless loop provided with abrasive grains are made of diamond or of cubic boron nitride.

The invention also relates to a method for cutting a mat or panel made of mineral wool or a board or a panel made of porous construction material, comprising the following steps:

providing a mat or panel made of mineral wool or a board or a panel made of porous construction material, moving the mat or panel made of mineral wool or a board or a panel made of porous construction material in a direction X by means for moving the mat or panel made of mineral wool or the board or the panel made of porous construction material, which comprise at least one conveyor, cutting the mat or panel made of mineral wool or the board or the panel made of porous construction material with an element that forms an endless loop provided with abrasive grains capable of running in a direction Y perpendicular to the direction X of movement of the mat or panel made of mineral wool or the board or the panel made of porous construction material, the element that forms an endless loop provided with abrasive grains preferably being a wire that forms an endless loop provided with abrasive grains, a cable that forms an endless loop provided with abrasive grains or a strip that forms an endless loop provided with abrasive grains.

According to another feature, the cutting is carried out by:

a wire that forms an endless loop provided with abrasive grains consisting of a steel wire with a diameter of between 0.80 and 1.30 mm, preferably between 0.95 and 1.15 mm, welded to the surface of which are abrasive grains, in particular of zirconium oxide, having a mean diameter of between 160 and 200 μm, preferably between 170 and 190 μm, or a cable that forms an endless loop provided with abrasive grains consisting of a twisted multistrand steel cable with a diameter of between 0.80 and 1.30 mm, preferably between 0.95 and 1.15 mm, welded to the surface of which are abrasive grains, in particular of zirconium oxide, having a mean diameter of between 160 and 200 μm, preferably between 170 and 190 μm, or a strip that forms an endless loop provided with abrasive grains consisting of a steel strip with a width of between 34 and 42 mm, preferably between 36 and 40 mm, and with a thickness of between 0.4 and 0.8 mm, preferably between 0.5 and 0.7 mm, comprising abrasive grains, in particular of zirconium oxide, having a mean diameter of between 160 and 200 μm, preferably between 170 and 190 μm, welded to an edge of the strip having a width of between 2 and 5 mm.

According to another feature, the element that forms an endless loop provided with abrasive grains, placed under tension around two pulleys, is moved by the rotation of one of the pulleys, which is itself rotated by a motor, the other pulley being freely rotatable, the space between the two pulleys being greater than at least one dimension of the mat or panel made of mineral wool or the board or the panel made of porous construction material to be cut, and each pulley preferably comprising on its perimeter a coating on which the element that forms an endless loop provided with abrasive grains rests.

According to another feature, the element that forms an endless loop provided with abrasive grains moves at a linear speed of between 10 m/s and 30 m/s, preferably between 10 and 20 m/s, or even between 10 and 15 m/s.

According to another feature, the tension of the wire that forms an endless loop provided with abrasive grains or of the cable that forms an endless loop provided with abrasive grains is between 150 N and 500 N, preferably between 200 and 300 N or the tension of the strip that forms an endless loop provided with abrasive grains is between 1500 N and 5000 N, preferably between 2000 and 4500 N, or even between 2000 and 3000 N.

According to another feature, the mat or panel made of mineral wool or the board or the panel made of porous construction material moves at a speed of between 200 mm/s and 1000 mm/s, preferably between 300 mm/s and 700 mm/s for cutting in the thickness and between 10 mm/s and 250 mm/s, preferably between 25 mm/s and 200 mm/s for cutting on the edges.

According to another feature, the cutting method further comprises a step of gripping the mat or panel made of mineral wool or the board or the panel made of porous construction material, the gripping means comprising a vacuum gripping system designed to move at the same time and in the same direction X as the means for moving the mat or panel made of mineral wool or the board or the panel made of porous construction material.

According to another feature, during the step of cutting the mat or the board, the element that forms an endless loop provided with abrasive grains is capable of moving in a direction Z perpendicular both to the direction X of movement of the mat or panel made of mineral wool or the board or the panel made of porous construction material and to the run direction Y of the element that forms an endless loop provided with abrasive grains, so as to carry out cutting along two directions that are perpendicular to one another, the element that forms an endless loop provided with abrasive grains preferably moving at a speed of between 10 mm/s and 250 mm/s, more preferentially still between 25 mm/s and 200 mm/s for cutting on the edges.

According to another feature, the cutting force, measured by at least one force sensor placed against the element that forms an endless loop provided with abrasive grains, is maintained between 10 and 30N by a real-time adjustment means.

According to another feature, the abrasive grains of the element that forms an endless loop provided with abrasive grains are made of diamond or of cubic boron nitride.

The invention also relates to a mineral wool panel cut by the cutting device as described above, according to the method described above, comprising, on at least one of its main faces or on one of its edges, a cut of excellent quality that is smooth down to a few tenths of a millimeter.

Other features and advantages of the invention will now be described with reference to the drawings in which:

FIGS. 2 and 3 depict a cross-sectional view of the upper pulley of the cutting device of FIG. 1, respectively for a diamond endless wire and a diamond endless cable and for a diamond endless strip;

FIG. 4 depicts a cross-sectional view of an example of cutting in a mat, panel or board, carried out with the device according to the invention;

FIG. 5 depicts various types of mat, panel or board edges.

Figure 1:
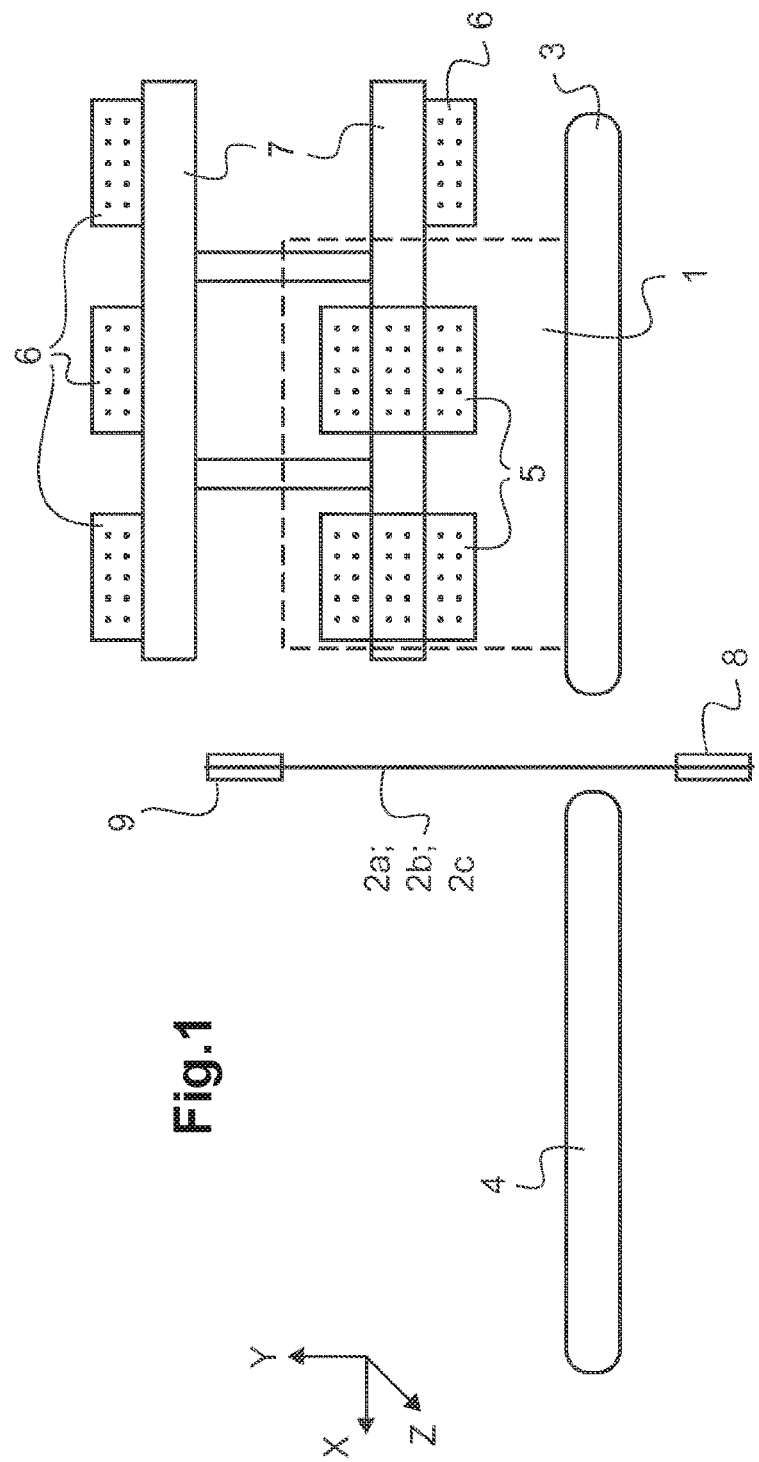
FIG. 1 depicts a front view of a cutting device according to the invention.

Reference numbers which are identical in the various figures represent elements that are similar or identical.

The invention relates to a device for cutting a mat or panel made of mineral wool or a board or a panel made of porous construction material, comprising means for moving the mat or panel made of mineral wool or the board or the panel made of porous construction material, which comprise at least one conveyor, capable of moving along a direction X, an element that forms an endless loop provided with abrasive grains, referred to as endless diamond element, designed to cut the mat or panel made of mineral wool or the board or the panel made of porous construction material, and means for running the element element that forms an endless loop provided with abrasive grains in a direction Y perpendicular to the direction X of movement of the mat or panel made of mineral wool or of the board or the panel made of porous construction material.

The element element that forms an endless loop provided with abrasive grains, preferably a wire that forms an endless loop provided with abrasive grains, a cable that forms an endless loop provided with abrasive grains or a strip that forms an endless loop provided with abrasive grains, allows an excellent-quality cut, with a clean surface finish, without the need to perform a subsequent sanding operation; this makes it possible to minimize the losses of material and the waste generated since the diamond element is much thinner than the saws of the known cutting devices. Furthermore, cutting with a wire that forms an endless loop provided with abrasive grains, a cable that forms an endless loop provided with abrasive grains or a strip that forms an endless loop provided with abrasive grains generates practically no dust, making it possible to improve operator working conditions.

Moreover, the fact that the element forms an endless loop makes it possible to have continuous production since reversals of motor rotation direction are avoided. Furthermore, the element that forms an endless loop provided with abrasive grains is no longer wound upon itself, which avoids premature wear of the latter.

Surprisingly, the use of a cutting element under the conditions of the invention allows for an extremely clean cut. Particularly in the case of a rock wool product containing grains of unfiberized material, it has been found that the particulate cutting residues are considerably reduced in number and in mass, and that they contain far fewer grains than with conventional cutting, the grains predominantly remaining included within the mineral product. It is assumed here that the cutting element makes itself a path between the fibers, respectively between the fibers and the grains, and frees the fibers by parting the entanglement of fibers rather than by breaking the fibers.

Such a use of an element that forms an endless loop provided with abrasive grains was not proposed in the prior art. Rather, the use of diamond wire had hitherto been intended for cutting hard and brittle materials, requiring a system for cooling via a jet of a hydraulic binder. The application of a diamond element by the inventors to the dry-cutting of fibrous materials, without a cooling water jet, has given rise to a novel usage giving access to fibrous products of a quality far superior to expectations.

This can be obtained by choosing a cutting element that is sufficiently thin in comparison with the defects of the fibrous product, typically having a diameter smaller than the size of the unfiberized particles which may measure from 1 to several millimeters in diameter.

According to the invention, the expression "endless diamond element" denotes an element that forms an endless loop provided with abrasive grains. It is a cutting element generally made of metal bearing on its surface abrasive grains or abrasive particles, such as natural or synthetic diamond, advantageously based on zirconium oxide or on cubic boron nitride (CBN). The grains or particles are retained on the surface of the core of the element by brazing or by means of a continuous deposition or metal plating. The abrasive grains or abrasive particles, with sharp and very hard edges, have a maximum cutting power without temperature rise.

More specifically, the term "diamond element" is understood to mean an element provided with abrasive grains made of natural or synthetic diamond, advantageously based on zirconium oxide, or on cubic boron nitride (CBN).

And an "endless element" is understood to mean an element, the two ends of which are attached to one another in order to form a continuous endless element that forms an closed loop.

A "matt, board or panel" is understood to mean either a continuous strip, which generally corresponds to a mat as it leaves the drying oven, or a mat or panel, of substantially parallelepipedal shape, which generally results from the on-line cutting after the drying oven, and which may even have been cut again off-line subsequently. The terms "mat or panel" include mats or panels designed to be rolled up for the marketing thereof.

FIG. 1 depicts a front view of the cutting device according to the invention.

The mineral wool mat or panel 1 intended to be cut on the device according to the invention has, for example, a density greater than 25 kg/m$^3$, preferably between 30 kg/m$^3$ and 180 kg/m$^3$ in order to facilitate the cutting. The mineral wool mat or panel may for example be coated with a film on each of its main faces. Such a film may give the mat mechanical and acoustic properties.

The board or panel 1 made of porous construction material, intended to be cut on the device according to the invention has, for example, a density greater than or equal to 5 kg/m$^3$, particularly at least 10 kg/m$^3$, in particular at least 20 to 25 kg/m$^3$ and preferably less than 180 kg/m$^3$.

In the remainder of the description, for simplification, "panel 1" will refer to the mineral wool mat or panel 1 or the board or the panel 1 made of porous construction material, without this being understood to be a limitation.

The cutting device according to the invention comprises means for moving a mat 1 in a direction X, and also an element 2a, 2b, 2c that forms an endless loop provided with abrasive grains, designed to cut the mat 1. The element 2a, 2b, 2c that forms an endless loop provided with abrasive grains is referred to, in the remainder of the description, for reasons of simplification but without this being understood to be limiting, as an endless diamond element 2a, 2b, 2c.

The cutting device according to the invention also comprises means 8, 9 for running the endless diamond element 2a, 2b, 2c in a direction Y perpendicular to the direction X of movement of the mat 1.

According to the embodiments, the endless diamond element 2a, 2b, 2c may moreover be stationary with respect to the direction Z or capable of moving along this direction Z, the direction Z being perpendicular both to the direction X of movement of the mat 1 and to the run direction Y of the endless diamond element 2a, 2b, 2c. Thus, the device makes it possible to produce cuts along two directions that are perpendicular to one another. In this way, several different cuts can be made in a single pass. Furthermore, by combining the two displacement movements in the directions X and Z, it is possible to produce cuts of various shapes. The endless diamond element 2a, 2b, 2c can thus allow, respectively, a cutting of the mat 1 in two in the thickness. When the diamond element is furthermore capable of moving along the Z direction, this further enables transverse cutting and cutting on the edges. All of the cuts can be made on-line.

When the mat or panel 1 rests vertically on the horizontal conveyor 3, 4, as illustrated in FIG. 1, the Z axis is horizontal and the Y axis is vertical.

When the mat 1 is in the form of a horizontal continuous strip, the Z axis is vertical and the Y axis is horizontal.

The means for moving the mat 1 comprise at least one conveyor 3, 4. The conveyor 3, 4 is a horizontal belt conveyor on which the mat 1 rests. The conveyor may advance forward or move back according to the requirements of the cutting. The direction of movement is the X axis in FIG. 1. The mat 1 may rest horizontally, laid flat, or vertically, laid on its edge, on the conveyor 3, 4.

The conveyor 3, 4 is preferably in two parts when the endless diamond element 2a, 2b, 2c is capable of moving in the Z direction. Thus, a space is provided between the two parts of the conveyor 3, 4 to allow the endless diamond element 2a, 2b, 2c to pass for the transverse cutting of the mat 1, without being impeded by the conveyor.

Furthermore, the device comprises means 5, 6, 7 for gripping the mat 1 in order to hold the mat in position. In such a case, the means 5, 6, 7 for gripping the mat 1 are capable of moving at the same time and in the same direction X as the conveyor 3, 4 for a uniform movement of the mat 1.

The means for gripping the mat 1 comprise a vacuum gripping system 5, 6, 7. The vacuum gripping system 5, 6, 7 consists of vacuum grippers 5, 6 fixed to a mobile support 7 designed to move at the same time as the conveyor or conveyors 3, 4 while the mat 1 is being cut. The vacuum grippers 5, 6 may take the form of plates pierced with a multitude of orifices which are connected to a depressurization means; the number and the diameter of the orifices are chosen as a function of the force that is to be applied locally to the mat 1. The grippers 5, 6 may have various sizes, as depicted in FIG. 1. The mat 1 should be perfectly held by the vacuum grippers 5, 6 while the endless diamond element 2a, 2b, 2c is cutting so as to enable a cut that is as precise as possible. Grippers of larger size 5 allow better holding of small-sized mats. The vacuum grippers 5, 6 should make it possible to hold the mat 1 without stressing or deforming it. These vacuum grippers absorb the stresses exerted by the endless diamond element during the movement of the mat 1 and/or of the endless diamond element 2a, 2b, 2c so as to ensure perfect control of the dynamic positioning of the mat, and while preventing any slippage of the mat with respect to the gripper. The various movements are synchronised by a numerical control system. In FIG. 1, only the vacuum grippers 5 are holding the mat 1 since in this exemplary embodiment, the mat is of small size. The peripheral vacuum grippers 6 are used in addition to the vacuum grippers 5 for mats 1 of larger size.

The endless diamond element is preferably a wire 2a that forms an endless loop provided with abrasive grains, referred to as an endless diamond wire 2*a*, a cable 2*b* that forms an endless loop provided with abrasive grains, referred to as an endless diamond cable 2*b* or a strip 2*c* that forms an endless loop provided with abrasive grains, referred to as an endless diamond strip 2*c*. The endless diamond wire 2*a* and the endless diamond cable 2*b* are particularly suitable for carrying out edge cuts, in particular edge reliefs, but also make it possible to carry out cuts in the thickness. The endless diamond strip 2*c* is particularly suitable for carrying out cuts in the thickness, but also makes possible to carry out edge cuts.

The endless diamond wire 2*a* is a steel wire with a diameter of between 0.80 and 1.30 mm, preferably between 0.95 and 1.15 mm, welded to the surface of which are abrasive grains, in particular of diamond or of cubic boron nitride, having a mean diameter of between 160 and 200 µm, preferably between 170 and 190 µm.

The endless diamond cable 2*b* is a twisted multistrand steel cable with a diameter of between 0.80 and 1.30 mm, preferably between 0.95 and 1.15 mm, welded to the surface of which are abrasive grains, in particular of diamond or of cubic boron nitride, having a mean diameter of between 160 and 200 µm, preferably between 170 and 190 µm. The fact that the cable is multistrand makes it possible to decouple the fatigue stresses compared to the wire 2*a*, which enables better mechanical strength.

The endless diamond strip 2*c* is a steel strip with a width of between 34 and 42 mm, preferably between 36 and 40 mm, and with a thickness of between 0.4 and 0.8 mm, preferably between 0.5 and 0.7 mm, welded on the surface of which are abrasive grains, in particular of diamond or cubic boron nitride, having a mean diameter of between 160 and 200 µm, preferably between 170 and 190 µm. The abrasive grains are preferably only present on an edge 20 of the strip 2*c*, as can be seen in FIG. 3. The width of this edge 20 is between 2 and 5 mm. This makes it possible to reduce the production costs. The cutting of the mat 1 is carried out by the edge 20 provided with abrasive grains.

The size of the grains of the endless diamond element 2*a*, 2*b*, 2*c* allows easy cutting without the cutting forces being too high. The welding electrolyte is preferably based on nickel. The grains penetrate sufficiently into the electrolyte so that they do not come loose under the effect of the cutting forces.

The density of abrasive grains should not be too high to prevent the risks of clogging. It should be adapted to the type of material to be cut, in particular it may be lower for cutting wood fibers than mineral fibers.

The endless diamond element 2*a*, 2*b*, 2*c* is positioned around two pulleys 8, 9, the space between the two pulleys 8, 9 being greater than at least one dimension of the mat 1 to be cut.

The endless diamond element 2*a*, 2*b*, 2*c* est preferably vertical (along the Y axis), as represented in FIG. 1. Only one of the pulleys, preferably the upper pulley 9, is rotated by a motor (not represented). The other pulley 8 is freely rotatable. The endless diamond element 2*a*, 2*b*, 2*c* is placed under tension owing to the adjustment of the vertical positioning of one of the pulleys, preferably of the upper pulley, 9, which is connected to a motor.

The control of the tension of the endless diamond element 2*a*, 2*b*, 2*c* is very important since the tension is a determining element for succeeding in obtaining a clean cutting of the mat 1. The tension of the endless diamond element 2*a*, 2*b*, 2*c* is controlled by adjusting the vertical positioning of the pulley 9. This adjustment is carried out in real time by means of a pneumatic system connected to a tension sensor of the endless diamond element 2*a*, 2*b*, 2*c* so as to retain a constant tension during the cutting.

FIGS. 2 and 3 depict a cross-sectional view of the upper pulley 9 of the cutting device of FIG. 1, respectively for a diamond endless wire and a diamond endless cable and for a diamond endless strip.

The upper pulley 9 comprises on its perimeter a coating 90, for example made of polyurethane. This coating 90 makes it possible to prevent any contact between the abrasive grains of the endless diamond element 2*a*, 2*b*, 2*c* and the material of the pulley, which is preferably metallic, in order to prevent premature wear.

The coating 90 furthermore has a high adhesion factor, which makes it possible to prevent any slippage between the endless diamond element 2*a*, 2*b*, 2*c* and the pulley 9 as soon as the latter is placed under tension.

The lower pulley 8 also comprises a coating, for example made of polyurethane, on its perimeter, for the same reasons.

In the embodiment of FIG. 2, the lower and upper pulleys 8 and 9 are moreover provided with a groove 95 intended to receive the endless diamond wire 2*a* or the endless diamond cable 2*b*. This groove also enables guiding of the wire or of the cable.

The diameter of the pulleys is at least 400 mm to limit the fatigue stresses of the endless diamond element.

In the embodiment of FIG. 3, the lower and upper pulleys 8 and 9 are moreover curved over their perimeter intended to receive the endless diamond strip 2*c*. This curvature 92 enables guiding of the strip.

The linear run speed of the endless diamond element 2*a*, 2*b*, 2*c* is between 10 m/s and 30 m/s, preferably between 10 and 20 m/s, or even between 10 and 15 m/s, in order to further improve the quality of the cutting. The endless diamond element 2*a*, 2*b*, 2*c* runs dry, without passing through a cooling liquid.

The tension of the endless diamond wire 2*a* or of the endless diamond cable 2*b* is between 150 N and 500 N, preferably between 200 N and 300 N in order to further improve the quality of the cutting by reducing the bending of the wire. The tension of the endless diamond wire or cable 2*a*, 2*b* depends on the diameter of the latter. Moreover, the more taut the endless diamond wire or cable 2*a*, 2*b* is, the more the bending thereof is reduced. Since the endless diamond wire 2*a* or the endless diamond cable 2*b* may be subjected to very high stresses, it is preferably made of steel with a very high yield strength that can withstand stresses that may reach 700 MPa, or even 800 MPa.

The tension of the endless diamond strip 2*c* is between 1500 N and 5000 N, preferably between 2000 and 4500 N, or even between 2000 and 3000 N in order to further improve the quality of the cutting by reducing the bending of the wire. The tension of the endless diamond strip 2*c* depends on the diameter of the latter. Moreover, the more taut the endless diamond strip 2*c* is, the more the bending thereof is reduced. Since the endless diamond strip 2*c* may be subjected to very high stresses, it is preferably made of steel with a very high yield strength that can withstand stresses that may reach 1250 MPa, or even 1600 MPa.

The cutting force of the endless diamond element 2*a*, 2*b*, 2*c* is another very important parameter for clean cutting of the mat. The cutting force depends in particular on the density of the material to be cut, on the feed speed of the mat, on the run speed of the endless diamond element, and also on the profile of the cut to be made. Therefore, the cutting device according to the invention comprises at least one force sensor placed against the endless diamond element

2a, 2b, 2c. The cutting force is thus adjusted in real time (for example every 5 ms) by control of the rotational speed of the upper pulley 9, which determines the run speed of the endless diamond element 2a, 2b, 2c and by the adjustment of the feed speed of the mat 1. The cutting force is preferably maintained between 10 and 30 N.

Lastly, the pulleys 8, 9 on which the endless diamond element 2a, 2b, 2c is positioned are mounted on a frame or a support (not represented), itself associated with movement means (not represented). These movement means allow a movement of the endless diamond element 2a, 2b, 2c in the Z direction of FIG. 1, namely along an axis perpendicular both to the direction of movement of the mat 1, which is along the X axis, and to the run direction Y of the endless diamond element 2a, 2b, 2c. The two displacement movements along the X and Z axes may be combined to make cuts of complex shape. The speed of movement of the endless diamond element 2a, 2b, 2c along the Z axis is between 10 mm/s and 250 mm/s, preferably between 25 mm/s and 200 mm/s for cutting on the edges in order to allow precision cutting of the geometric pattern of the edges.

The cutting device according to the invention makes it possible to cut a mat 1:
- in its width or its length in order to obtain a mat of smaller size,
- in its thickness in order to obtain at least two mats with a thickness smaller than that of the initial mat, and/or
- on its edges in order to produce a rabbet or any other form of edge detail.

During cutting, the speed of movement of the mat 1 is between 200 mm/s and 1 m/s, preferably between 300 mm/s and 700 mm/s for cutting in the thickness, of the splitting type, and between 10 mm/s and 250 mm/s, preferably between 25 mm/s and 200 mm/s for cutting on the edges in order to allow precision of the geometric pattern of the edges. The mat 1 moves by the combined movement of the conveyors 3, 4 and of the vacuum gripping system 5, 6, 7.

The rabbets or edge cuts may have any conceivable shape, with geometries as varied as square, rectangular, triangular, polygonal, rounded, curvilinear, sinusoidal, etc. FIG. 5 depicts various types of mat, panel or board edges. These examples of edges come from standard EN 13964:2014 (F).

The displacement movements of the mat, the displacement movements of the diamond element, the rotational speed of the upper pulley, the adjustment of the tension and of the cutting force, and also the actuation of the vacuum grippers are motorized and controlled by a general control system of the device.

The cutting device according to the invention makes it possible for example to produce mineral wool acoustic panels for ceilings. The rabbets made on each of the edges of such acoustic panels are intended to rest on a metal framework fastened to the ceiling. Such panels are generally of square shape but may also be rectangular. When the mat is cut into two in the thickness starting from a mat coated with a film on its two main faces, the resulting panel has a film on only one of its main faces. A film may then be adhesively bonded to the other main face of the panel resulting from the cut.

The cutting device according to the invention makes it possible for example to cut a mineral wool mat or panel simultaneously in its thickness, transversely across its width, and on its edges to create rabbets or any other edge detail, as shown in FIG. 3 for example.

FIG. 4 depicts a cross-sectional view of one example of a cut in a mat, made with the device according to the invention, preferably with the endless diamond wire or cable 2a, 2b, along a path defined by the succession of portions marked by the capital letters.

Thus, the mat may be cut on one of its edges to produce a rabbet (reference T), then into two in its thickness (reference A), then transversely across its width with simultaneous cutting of rabbets (references B, C, D, E), then again cut into two in its thickness (reference F), and so on so as to form several mats or panels with rabbets cut on two opposite edges. Each mat or panel obtained is then turned through 90° to make a transverse cut in the direction of the initial length with simultaneous cutting of rabbets on the two remaining edges. The rotation through 90° may be carried out by means of a system of vacuum grippers similar to the grippers 5, 6, positioned facing the grippers 5, 6. As a variant, the cut mats may be conveyed to another cutting station equipped with another endless diamond element arranged to cut rabbets on the remaining edges.

It is also possible to first of all cut the mat to the correct size and then cut the rabbets.

It is also possible to first of all cut the mat 1 in its thickness using the endless diamond strip 2c and then to cut the edges using the endless diamond wire or cable 2a, 2b.

One or more mats, for example square or rectangular mats, are then obtained with rabbets on each of their edges and, optionally, a film on one of their main faces (if the initial mat is cut into two in the thickness and if it had a film on each of its main faces). Each mat of this type may subsequently be provided with a decorative film on its other main face.

The invention also relates to a cutting method using the cutting device according to the invention.

Thus, the method for cutting a mat comprises the following steps:
- providing a mat 1,
- moving the mineral mat 1 in a direction X by means 3, 4 for moving the mat 1, which comprise at least one conveyor,
- cutting the mat with an endless diamond element 2a, 2b, 2c capable of running in a direction Y perpendicular to the direction X of movement of the mat 1.

During cutting, the mat 1 is moved by virtue of the conveyor 3, 4. It may be held by virtue of the vacuum gripping system 5, 6, 7. The endless diamond element 2a, 2b, 2c may be capable of moving in a direction Z perpendicular both to the direction X of movement of the mat 1 and to the run direction Y of the endless diamond element 2a, 2b, 2c.

The invention also relates to the mat cut by the cutting device according to invention, according to the method according to the invention, this mat comprising, on at least one of its main faces or on one of its edges, a cut of excellent quality that is smooth down to a few tenths of a millimeter. This is understood to mean that the surface resulting from the cutting has a distance between the most protruding point of this surface and the most recessed point of this surface of at most a few tenths of a millimeter, in particular 2 tenths of a millimeter.

The process according to the invention also guarantees the attainment of great dimensional precision for the panel, two mutually parallel opposite edges of which have a difference in parallelism of no greater than 2 tenths of a millimeter.

The invention claimed is:
1. A device for cutting a mat or panel made of mineral wool or a board or a panel made of porous construction material, comprising:

a system configured to move the mat or panel made of mineral wool or the board or the panel made of porous construction material, which comprises at least one conveyor adapted to move along a direction, an element, that forms an endless loop provided with abrasive grains, designed to cut the mat or panel made of mineral wool or the board or the panel made of porous construction material, a device configured to run the element that forms an endless loop provided with abrasive grains in a direction perpendicular to the direction of movement of the mat or panel made of mineral wool or the board or the panel made of porous construction material, the element that forms an endless loop provided with abrasive grains being a wire that forms an endless loop provided with abrasive grains, a cable that forms an endless loop provided with abrasive grains or a strip that forms an endless loop provided with abrasive grains, wherein:

the wire that forms an endless loop provided with abrasive grains is a steel wire with a diameter of between 0.80 and 1.30 mm welded to the surface of which are abrasive grains having a mean diameter of between 160 and 200 µm, or the cable that forms an endless loop provided with abrasive grains is a twisted multistrand steel cable with a diameter of between 0.80 and 1.30 mm welded to the surface of which are abrasive grains having a mean diameter of between 160 and 200 µm, or the strip that forms an endless loop provided with abrasive grains is a steel strip with a width of between 34 and 42 mm and with a thickness of between 0.4 and 0.8 mm, comprising abrasive grains having a mean diameter of between 160 and 200 µm welded to an edge of the strip having a width of between 2 and 5 mm.

2. The cutting device as claimed in claim 1, wherein the element that forms an endless loop provided with abrasive grains is placed under tension around two pulleys, a space between the two pulleys being greater than at least one dimension of the mat or panel made of mineral wool or the board or the panel made of porous construction material to be cut, one of the pulleys being freely rotatable while the other is capable of being rotated by a motor.

3. The cutting device as claimed in claim 1, wherein the linear run speed of the element that forms an endless loop provided with abrasive grains is between 10 m/s and 30 m/s.

4. The cutting device as claimed in claim 1, wherein the tension of the wire that forms an endless loop provided with abrasive grains or of the cable that forms an endless loop provided with abrasive grains is between 150 N and 500 N or the tension of the strip that forms an endless loop provided with abrasive grains is between 1500 N and 5000 N.

5. The cutting device as claimed in claim 1, further comprising a gripping system configured to grip the mat or panel made of mineral wool or the board or the panel made of porous construction material, the gripping system comprising a vacuum gripping system designed to move at the same time and in the same direction as the system configured to move the mat or panel made of mineral wool or the board or the panel made of porous construction material.

6. The cutting device as claimed in claim 1, further comprising a system for moving the element that forms an endless loop provided with abrasive grains, the element that forms an endless loop provided with abrasive grains being capable of moving in a direction perpendicular both to the direction of movement of the mat or panel made of mineral wool or the board or the panel made of porous construction material and to the run direction of the element that forms an endless loop provided with abrasive grains, a speed of movement of the element that forms an endless loop provided with abrasive grains being between 10 mm/s and 250 mm/s for cutting on the edges.

7. The cutting device as claimed in claim 1, wherein a speed of movement of the mat or panel made of mineral wool or the board or the panel made of porous construction material is between 200 mm/s and 1000 mm/s for cutting in the thickness and between 10 mm/s and 250 mm/s for cutting on the edges.

8. The cutting device as claimed in claim 1, further comprising at least one force sensor placed against the element that forms an endless loop provided with abrasive grains, and also a means for adjusting, in real time, the cutting force in order to maintain it between 10 and 30 N.

9. The cutting device as claimed in claim 1, wherein the abrasive grains of the element that forms an endless loop provided with abrasive grains are made of diamond or of cubic boron nitride.

10. The cutting device as claimed in claim 1, wherein the wire that forms an endless loop provided with abrasive grains is a steel wire with a diameter of between 0.80 and 1.30 mm welded to the surface of which are abrasive grains having a mean diameter of between 160 and 200 µm, or the cable that forms an endless loop provided with abrasive grains is a twisted multistrand steel cable with a diameter of between 0.80 and 1.30 mm welded to the surface of which are abrasive grains having a mean diameter of between 160 and 200 µm.

11. The cutting device as claimed in claim 1, wherein the abrasive grains of the strip have a mean diameter of between 170 and 200 µm.

12. The cutting device as claimed in claim 1, wherein the abrasive grains include zirconium oxide or cubic boron nitride (CBN).

13. A method for cutting a mat or panel made of mineral wool or a board or a panel made of porous construction material, comprising:

providing a mat or panel made of mineral wool or a board or a panel made of porous construction material, moving the mat or panel made of mineral wool or a board or a panel made of porous construction material in a direction by a system configured to move the mat or panel made of mineral wool or the board or the panel made of porous construction material, which comprise at least one conveyor, cutting the mat or panel made of mineral wool or the board or the panel made of porous construction material with an element that forms an endless loop provided with abrasive grains capable of running in a direction perpendicular to the direction of movement of the mat or panel made of mineral wool or the board or the panel made of porous construction material, the element that forms an endless loop provided with abrasive grains being a wire that forms an endless loop provided with abrasive grains, a cable that forms an endless loop provided with abrasive grains or a strip that forms an endless loop provided with abrasive grains, wherein the cutting is carried out by:

a wire that forms an endless loop provided with abrasive grains consisting of a steel wire with a diameter of between 0.80 and 1.30 mm welded to the surface of which are abrasive grains having a mean diameter of between 160 and 200 μm, or a cable that forms an endless loop provided with abrasive grains consisting of a twisted multistrand steel cable with a diameter of between 0.80 and 1.30 mm welded to the surface of which are abrasive grains having a mean diameter of between 160 and 200 μm, or a strip that forms an endless loop provided with abrasive grains consisting of a steel strip with a width of between 34 and 42 mm and with a thickness of between 0.4 and 0.8 mm comprising abrasive grains having a mean diameter of between 160 and 200 μm welded to an edge of the strip having a width of between 2 and 5 mm.

14. The cutting method as claimed in claim 13, wherein the element that forms an endless loop provided with abrasive grains, placed under tension around two pulleys, is moved by the rotation of one of the pulleys, which is itself rotated by a motor, the other pulley being freely rotatable, the space between the two pulleys being greater than at least one dimension of the mat or panel made of mineral wool or the board or the panel made of porous construction material to be cut.

15. The cutting method as claimed in claim 13, wherein the element that forms an endless loop provided with abrasive grains moves at a linear speed of between 10 m/s and 30 m/s.

16. The cutting method as claimed in claim 13, wherein the tension of the wire that forms an endless loop provided with abrasive grains or of the cable that forms an endless loop provided with abrasive grains is between 150 N and 500 N or the tension of the strip that forms an endless loop provided with abrasive grains is between 1500 N and 5000 N.

17. The cutting method as claimed in claim 13, wherein the mat or panel made of mineral wool or the board or the panel made of porous construction material moves at a speed of between 200 mm/s and 1000 mm/s for cutting in the thickness and between 10 mm/s and 250 mm/s for cutting on the edges.

18. The cutting method as claimed in claim 13, further comprising a step of gripping, with a gripping system, the mat or panel made of mineral wool or the board or the panel made of porous construction material, the gripping system comprising a vacuum gripping system designed to move at the same time and in the same direction as the system configured to move the mat or panel made of mineral wool or the board or the panel made of porous construction material.

19. The cutting method as claimed in claim 13, wherein, during the step of cutting the mat or the board, the element that forms an endless loop provided with abrasive grains is capable of moving in a direction perpendicular both to the direction of movement of the mat or panel made of mineral wool or the board or the panel made of porous construction material and to the run direction of the element that forms an endless loop provided with abrasive grains, so as to carry out cutting along two directions that are perpendicular to one another, the element that forms an endless loop provided with abrasive grains preferably moving at a speed of between 10 mm/s and 250 mm/s for cutting on the edges.

20. The cutting method as claimed in claim 13, wherein the cutting force, measured by at least one force sensor placed against the element that forms an endless loop provided with abrasive grains, is maintained between 10 and 30N by a real-time adjustment means.

21. The cutting method as claimed in claim 13, wherein the abrasive grains of the element that forms an endless loop provided with abrasive grains are made of diamond or of cubic boron nitride.

* * * * *